United States Patent [19]

Satzler

[11] Patent Number: 4,501,629

[45] Date of Patent: Feb. 26, 1985

[54] METHOD AND APPARATUS FOR EXTRUDING REINFORCED HOSE

[75] Inventor: Ronald L. Satzler, Princeville, Ill.

[73] Assignee: Caterpillar Tractor Co., Peoria, Ill.

[21] Appl. No.: 509,107

[22] Filed: Jun. 29, 1983

[51] Int. Cl.³ .................. B29D 23/05; B65H 81/00
[52] U.S. Cl. .................. 156/149; 156/244.13; 156/393; 264/103; 425/114; 425/133.1
[58] Field of Search .................. 156/149, 393, 244.12, 156/244.13, 143, 144; 264/103, 173; 425/113, 114, 122, 133.1, 463

[56] References Cited

U.S. PATENT DOCUMENTS

| | | | |
|---|---|---|---|
| 3,586,558 | 6/1971 | Galloway et al. | 156/149 |
| 3,755,032 | 8/1973 | Higbee | 156/86 |
| 3,776,794 | 12/1973 | Ingham | 156/143 |
| 3,856,447 | 12/1974 | Schiesser | 425/114 |
| 3,905,853 | 9/1975 | Stert | 156/244.13 |
| 4,155,790 | 5/1979 | Galloway | 156/149 |
| 4,161,379 | 7/1979 | Sudyk | 425/112 |
| 4,175,992 | 11/1979 | Grawey | 156/143 |
| 4,202,718 | 5/1980 | Mzutani et al. | 156/171 |
| 4,259,991 | 4/1981 | Kutnyak | 138/127 |
| 4,268,333 | 5/1981 | Schwarz | 156/161 |

OTHER PUBLICATIONS

Karg Braiders–Advertising Brochure.
The Rockwell 225-II–Advertising Brochure.

Primary Examiner—Michael Ball
Attorney, Agent, or Firm—J. W. Burrows

[57] ABSTRACT

Extruded reinforced hoses are useful in fluid systems which operate at high pressures. Other reinforced hoses are prepared in individual stations for particular parts of the reinforced hose consequently requiring large amounts of manufacturing floor space. Still other processes require extruding a hose on a mandrel and subsequently applying a fabric reinforcement member. In these processes, the length of the hose is limited by the length of the mandrel. The present apparatus produces an extruded reinforced hose (10) by braiding a metal reinforcement member (16) on a mandrel (42) and extruding a liner (21) and cover (22) at approximately the same location as the member (16) leaves the mandrel (42). The formed hose (10) is pulled at a linear rate faster than the hose (10) is being produced in order to change the braid angle of the braided member (16) to a predetermined selected braid angle and holding for subsequent curing. The metal braided reinforcement member (16) provides the high strength characteristic while the extruding of the liner (21) and the cover (22) at approximately the same location near the mandrel (42) eliminates the need for separate lengthy mandrels on which to extrude the hose (10), thus minimizing manufacturing floor space and reducing costs.

8 Claims, 3 Drawing Figures

METHOD AND APPARATUS FOR EXTRUDING REINFORCED HOSE

DESCRIPTION

1. Technical Field

This invention relates generally to the manufacturing of hose and more particularly to the method and apparatus for extruding reinforced hose.

2. Background Art

Reinforced hose is used in applications requiring containment of fluids under high pressure. In some conventional manufacturing processes, a liner or core member is formed by extruding a polymeric material such as rubber onto a mandrel. After formation of the liner member, a fabric reinforcement member is formed over the liner member. Then an outer cover is extruded over the reinforcement ply. The resultant hose, which has a length dependent upon the mandrel length, is typically removed from the forming mandrel after curing. One of the problems associated with such conventional methods is the length of hose produced is limited by the length of the mandrel and associated apparatus used for supporting the mandrel. Another problem associated with conventional methods is fabric reinforcement members or strands do not provide the strength characteristics as compared to metal strands. However when using metal strands, especially in braiding, a high tensile load is applied to the strands during the braiding operation which would damage the softer uncured liner. Consequently, it is desirable to form a fabric reinforcement on the linear prior to braiding the metal reinforcement onto the liner. Without the fabric reinforcement, the metal strands would cut into and possibly through the liner material. This further adds to the cost of conventional methods of making hose.

Several processes have been developed to manufacture flexible fabric reinforced hose on a continuous basis. These normally require extruding the liner at one location, followed by forming the fabric reinforcement member onto the liner at a different location, then extruding a cover over the fabric reinforcement member at yet another location. As easily recognized, this process requires large amounts of manufacturing floor space to produce the hose. As is well known, large manufacturing floor space adds directly to the cost of producing the hose.

Another process taught for continuous hose making forms a fabric reinforcing layer on a mandrel simultaneously with extrusion of an elastomeric material through an annular orifice positioned inwardly of the reinforcement layer at one end of the mandrel. The outer layer is formed by the elastomeric material being forced through the openings in the reinforcement member. When making a high pressure hose, a tightly woven metal reinforcement member is highly desirable. Consequently, the openings or interstices in the reinforcement member are too small to pass ample elastomeric materials through for forming the outer cover. Furthermore it is highly desirable to have the liner and cover made from different materials. For best performance of the hose, the properties of the liner should be different from those of the cover.

Other processes involve simultaneous extrusion of an inner linear and outer cover onto a fabric reinforcement strip that is shaped into a spiral tube with overlapping portions prior to extruding the liner and cover. Hoses made from processes of this type do not have the needed strength as compared to a tightly woven metal reinforcement member.

The present invention is directed to overcoming one or more of the problems as set forth above.

DISCLOSURE OF THE INVENTION

In one aspect of the present invention a method is provided for forming a flexible reinforced hose. A tubular reinforcement member having inner and outer surfaces is braided on a mandrel. As the braided reinforcement member is progressively removed from the mandrel, an elastomeric liner is extruded onto the inner surface of the braided reinforcement member from a first extruder and an elastomeric cover is extruded onto the outer surface of the braided reinforcement member from a second extruder. The extruding of the elastomeric cover and liner occur at approximately the same axial location and adjacent the mandrel.

In another aspect of the present invention an apparatus is provided for forming a flexible reinforced hose. The apparatus includes a braiding machine adapted to continuously braid a tubular reinforcement member having inner and outer surfaces on a mandrel. A first means is provided for extruding a liner onto the inner surface of the reinforcement member as the member is being removed from the mandrel while a second means is provided for extruding a cover onto the outer surface of the reinforcement member. The liner and cover are extruded at approximately the same axial location and adjacent the first end portion of the mandrel.

The present invention solves the problem of producing high pressure hose in lengths limited by the length of the mandrel. Furthermore, it provides a high strength hose that can be continuously made by extruding both the liner and cover at approximately the same axial location onto a tightly woven metal reinforcement member such as a braided reinforcement member without requiring application of additional fabric reinforcement on the liner prior to braiding. These advantages help reduce the cost of making a high pressure hose.

BEST MODE FOR CARRYING OUT THE INVENTION

Figure 1:
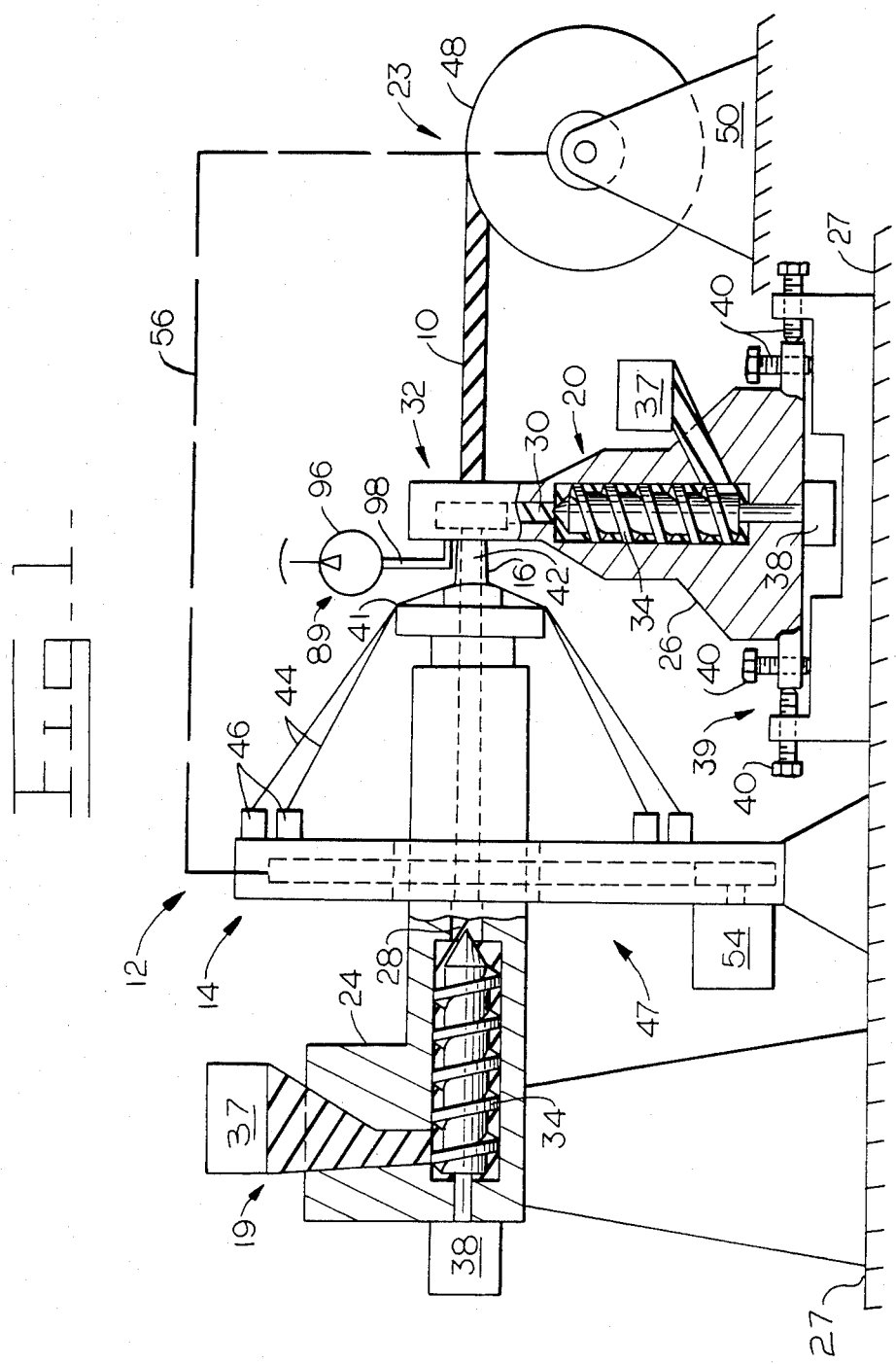
FIG. 1 is a diagrammatic illustration of an apparatus of an embodiment of the present invention.
Figure 3:
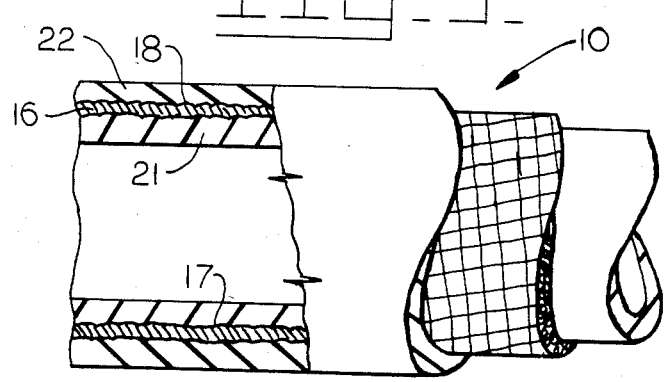
FIG. 3 is a diagrammatic illustration of a flexible reinforced hose produced by the apparatus of FIG. 1.

Referring now to FIGS. 1 and 3 of the drawings, an apparatus for continuously forming a flexible reinforced hose 10 is generally indicated by the reference numeral 12. The apparatus 12 includes a conventional braid forming machine 14 which continuously produces a braided tubular reinforced member 16 having inner and outer surfaces 17,18, first and second means 19,20 for extruding a liner 21 and a cover 22 from an elastomeric material, such as rubber, onto the reinforced member 16, and a means 23 for pulling and holding the reinforced hose for subsequent curing.

The first and second means 19,20 for extruding the elastomeric material includes first and second extruders 24,26 mounted on a base 27, a die mechanism 32 having portions respectively connected to the extruders 24,26, and passages 28,30 respectively connecting the extruders 24,26 to the die mechanism 32. Each of the extruders 24,26 includes an extruder screw 34 and a hopper 37 for supplying the elastomeric material to the respective extruder screw 34. Each of the extruder screws 34 can be driven by any conventional manner such as by a motor 38.

The second extruder 26 is adjustably mounted on the base 27 by an adjustment mechanism 39. The adjustment mechanism 39 provides both radial and axial adjustment of the second extruder 26 relative to the portion of the die mechanism 32 that is connected to the first extruder 24. The adjustment mechanism 39, as diagrammatically shown, includes a plurality of adjustment screws 40 positioned around the base of the second extruder 26 and the portion of the base 27 that receives the base of the second extruder 26. It should be recognized that other types of mechanisms could be used to adjust the mounting position of the second extruder 26 without departing from the essence of the invention.

The braiding machine 14 includes a guide ring 41 and a mandrel 42 on which the reinforcement member 16 is formed. A plurality of elongated strands 44 (only a portion of which are shown), such as strands of metallic wire, are drawn from a plurality of bobbins 46 carried on rotating spindles on the braiding machine 14 and are directed in a predetermined pattern by the braiding machine across the guide ring 41 onto the mandrel 42. Half of the plurality of bobbins 46 are rotating in an opposite direction relative to the other half so that the strands 44 are spirally wrapped on the mandrel 42 in an alternating overlapping interwoven relationship to continuously produce the braided tubular member 16. The braided tubular member 16 has a continuous circumferential surface and is made in a continuous linear length. Preferably, the strands 44 are positioned in an abutting relationship with one another to form a close knit braid which has a total initial coverage on the mandrel 42 allowing substantially no openings therebetween.

A drive mechanism 47 drives the braiding machine 14 and the pulling and holding means 23 proportional one to the other. The pulling and holding means 23 includes a reel 48 mounted on a trunnion 50 for taking up the reinforced hose 10. The drive mechanism 47 includes a drive motor 54 mounted on the braiding machine 14 and a mechanical connection, diagrammatically illustrated by a dashed line 56, connecting the braiding machine 14 and the pulling and holding means 23 to the drive motor 54.

Figure 2:
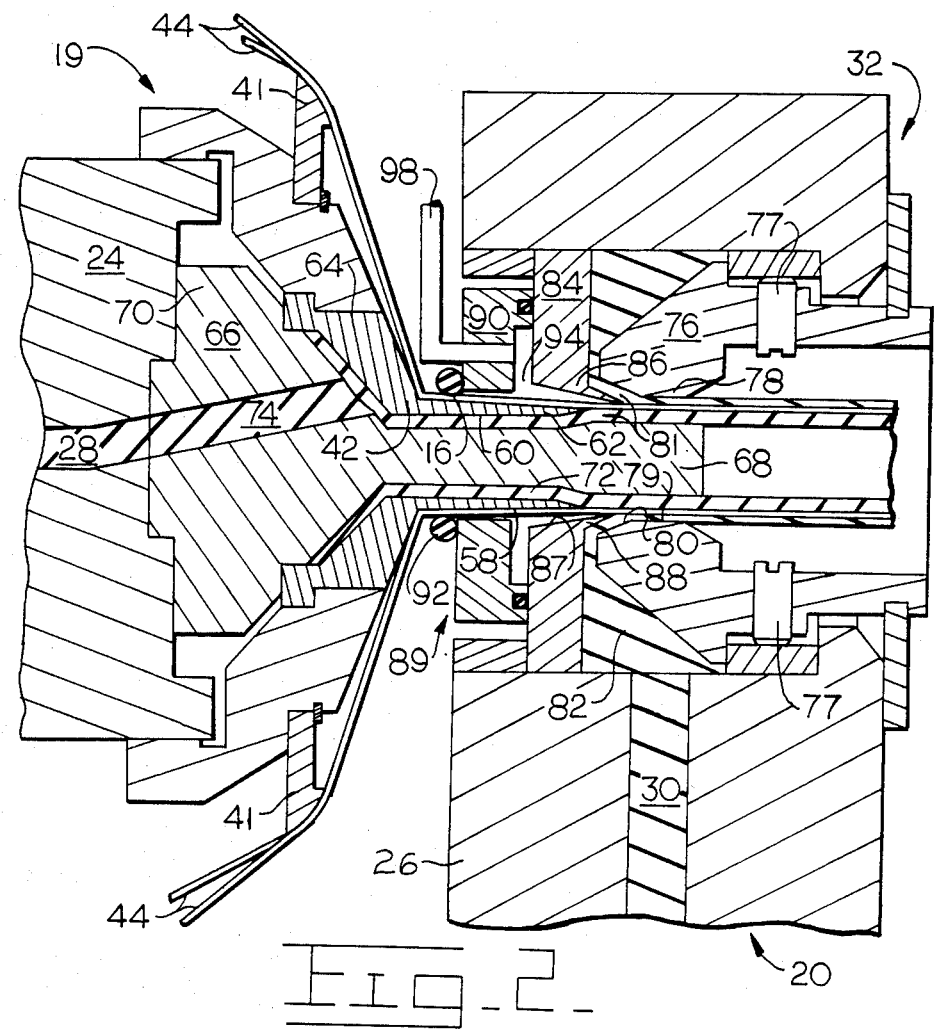
FIG. 2 is a somewhat enlarged partial sectional view of a portion of the apparatus of FIG. 1 and illustrating components in more detail.

Referring more specifically to FIG. 2, the mandrel 42 includes a tapered outer surface 58 and a bore 60. The mandrel 42 has a first end portion 62 terminating in the die mechanism 32 and has a second end portion 64 secured to the first extruder 24.

The die mechanism 32 includes an internal shaping member. The internal shaping member 66 extends through the bore 60 of the mandrel 42 and has a first end portion 68 extending beyond the first end portion 62 of the mandrel 42 and has a second end portion 70 which is connected to the first extruder 24. A cavity 72 is defined between the bore 60 of the mandrel 42 and the internal shaping member 66. The cavity 72 is connected to the passage 28 through a port 74 located in the second end portion 70 of the internal shaping member 66.

The die mechanism 32 further includes an external shaping member 76 located on the second extruder 26. The external shaping member 76 is adjustably positioned on the second extruder 26 by a plurality of screws 77. The external shaping member 76 has an inside portion 78 at one end which is radially disposed about the first end portion 68 of the internal shaping member 66. The inside portion 78 defines a bore 79 having a tapered leading edge 80 and the bore 79 is adapted to shape the cover 22 of the hose 10. An annular space 81 is defined between the first end portion 68 of the internal shaping member 66, the inside portion 78 of the external shaping member 76, and the first end portion 62 of the mandrel 42. A chamber 82 connects the annular space 81 with the passage 30 of the second extruder 26. The chamber 82 is formed by the end of the external shaping member 76 and a guide collar 84. An internal portion 86 of the guide collar 84 includes a bore 87 and is radially disposed about a portion of the first end portion 62 of the internal shaping member 66. The internal portion 86 includes a tapered projection 88 that extends into the space 81 but in an axially spaced relationship to the tapered leading edge 80 of the bore 79.

A means 89 is provided for evacuating entrained air between the liner 21 and cover 22 during extrusion of the liner and cover. The means 89 for evacuating includes an annular element 90 which is radially and concentrically disposed about the mandrel and the reinforcement member 16 and is in sealing engagement with the guide collar 84 on the side opposite the chamber 82. A sealing element, such as an O-ring 92 is disposed about the mandrel 42 and the reinforcement member 16 and is in intimate contact with an outside portion of the annular element 90. The element 90 and the guide collar 84 define a chamber 94 which is in communication with the space 81 provided beyond the first end portion 62 of the mandrel 42. A vacuum pump 96, see FIG. 1, is connected to the chamber 94 by a conduit 98. The vacuum pump 96 can be driven by any suitable means such as an electric motor (not shown).

Industrial Applicability

In the use of the apparatus 12, the braiding machine 14 braids the strands of wire 44 onto the mandrel 42 to continuously form the reinforcement member 16. The mandrel 42 is preferably a tapered mandrel and the braiding of the strands 44 onto the larger end of the tapered surface 58 results in the closely knit braid which allows substantially no openings therebetween. This 100% coverage results in an initial braid angle of approximately 68° and the action of the strands being laid adjacent to one another plus the lead of the strands 44 being laid onto the mandrel results in the reinforcement member 16 being progressively pushed towards the smaller end of the tapered surface 58 as a result of the braiding function. As the braided reinforcement member 16 leaves the first end portion 62 of the mandrel 42 and enters the annular space 81, the liner 21 is extruded onto the inner surface 17 of the reinforcement member 16. This is accomplished by the elastomeric material, such as rubber, being extruded into the annular space 81 just beyond the first end portions 62 of the mandrel 42 through the passage 28, the port 74 and the cavity 72. The first end portion 68 of the internal shaping member 66 forms the internal surface of the liner 21 while the outer portion of the liner 21 is formed by the inner surface 17 of the reinforcement member 16. Due to the high pressure used for extruding the liner 21, for example 13,800 kPa (2000 psi), the rubber flows into the small interstices filling any spaces thus providing a rubber cushion between some of the strands 44. Furthermore, the rubber adheres to the strands 44 and during the curing process the rubber bonds to the strands 44. This "consolidation" of the liner 21 and the braided member 16 results in a hose 10 which better endures large, continuous fluctuations that occur in high pressure systems.

At approximately the same axial location the cover 22 is formed over the reinforcement member 16 by the elastomeric material being extruded into the annular space 81 from the second extruder 26 through the passage 30 and the chamber 82. In this embodiment, the pressure for extruding the cover 22 is less than the extruding pressure used for the liner 21, for example 10,350 kPa (1500 psi). It should be recognized that the extruding pressures could be the same or at other pressure levels without departing from the essence of this invention. The tapered projection 88 on the guide collar 84 relative to the tapered leading edge 80 of the bore 79 generally preforms the shape of the cover 22 and directs the generally preformed cover into the bore 79 for final forming. This helps to eliminate the tendency for some of the elastomeric material to "feather" between the bore 87 of the guide collar 84 and the braided member 16.

By having the braided member 16 formed on the mandrel 42 and being continuously forced off of the mandrel 42 at a rate dependent on the braiding speed, the extrusion of the liner 21 and cover 22 is completed very close to the first end portion 62 of the mandrel 42. This compactness of operations minimizes floor space while continuously producing a reinforced hose having a braided reinforcement member with a continuous circumferential surface. Furthermore, by using two separate extruders, the material of the liner can be different from that of the cover. The liner needs properties relating to the fluids passing therethrough while the cover needs properties to resist abrasion, cutting, scuffing, etc.

Even though the preferred embodiment teaches the extrusion of both the liner 21 and cover 22 closely adjacent the mandrel 42, it should be recognized that the axial distance for extruding the liner 21 and cover 22 relative to the mandrel 42 is limited only by the ability to extend the first end portion 68 of the internal shaping member 66 further into the formed braided member 16 and the routing of the elastomeric material through the internal shaping member 66. Practically, the maximum axial distance would be proportional to the size of hose being produced. The axial distance from the first end portion 62 of the mandrel 42 to the location of extruding the liner 21 and cover 22 would practically not exceed twice the diameter of hose being produced.

The concentricity of the liner 21 and cover 22 with the braided member 16, is maintained by controlling the relationship of the external shaping member 76 and the guide collar 84 relative to the first end portion 68 of the internal shaping member 66 and the mandrel 42. Since the external shaping member 76 and the guide collar 84 are mounted on the second extruder 26, the adjustment mechanism 39 can simultaneously adjust the external shaping member 76 and guide collar 84 in all directions. Furthermore the plurality of screws 77 can radially adjust the external shaping member 76 relative to the guide collar 84.

The vacuum pump 96 draws air from the chamber 94 which removes the entrained air from the annular space 81 adjacent the first end portion 62 of the mandrel 42 thus reducing the air in the space just prior to the liner 21 and cover 22 being extruded onto the reinforcement member 16. The "O" ring 92 disposed about the mandrel 42 and braided member 16 seals the opening between the annular element 90 and the braided member 16 while providing freedom of movement of the braided member 16 towards the first end portion 62 of the mandrel 42.

The reel 48 of the withdrawing and holding means 23 takes up the reinforced hose 10 as it exits the die mechanism 32. The take-up reel 48 is driven by the mechanical connection 56 which is connected to the drive motor 54 so that the reel 48 is driven at a rate faster than the linear rate that the hose 10 is being extruded through the die mechanism 32. This faster linear rate pulls on the uncured reinforced hose 10 and changes the braid angle of the reinforcement member to a predetermined braid angle, for example approximately 53°. The hose is held on the reel 48 at the predetermined braid angle for subsequent storing and curing. The curing may be accomplished in a batch type arrangement such as an autoclave curing, not shown. After curing, the force on the hose is released thus allowing the hose to rebound to an optimum braid of 54° 44′.

Thus, the method of forming a flexible reinforced hose comprises the steps of braiding a reinforcement member on a mandrel, progressively removing the member from the mandrel, extruding an elastomeric liner from a first extruder onto the inner surface of the braided reinforcement member, and extruding an elastomeric cover from a second extruder onto the outer surface of the braided reinforcement member at approximately the same axial location of extruding the liner on the inner surface and adjacent the mandrel. The method further includes the step of pulling the reinforced hose at a linear rate faster than the rate of extruding the hose so that the braid angle of the reinforcement member is changed to a predetermined braid angle, and holding the hose during storage and subsequent curing to maintain the hose at a predetermined braid angle. Additionally, the method includes forming the liner to a predetermined size and preshaping the cover and directing the preshaped cover in the axial direction of extruding for final forming. The method further includes the step of adjusting one of the extruders to produce concentricity between the liner, the reinforcement member, and the cover.

In view of the foregoing, it is readily apparent that the method and apparatus provides a continuous hose making process that does not require large amounts of manufacturing floor space and provides the apparatus to braid a reinforcement member on a mandrel for subsequently extruding a cover and liner onto the reinforcement member at approximately the same axial location and adjacent the first end of the mandrel. The braided reinforcement member provides a resulting high strength, reinforced hose at an economical cost.

Other aspects, objects and advantages of this invention can be obtained from a study of the drawings, the disclosure and the appended claims.

I claim:

1. A method for forming a flexible reinforced hose (10), comprising the steps of:
    braiding a tubular reinforcement member (16) only directly on a mandrel (42), said member (16) having inner and outer surfaces (17,18);
    progressively pushing the member (16) from the mandrel (42) in response to the braiding action;
    extruding an elastomeric liner (21) from a first extruder (24) onto the inner surface (17) of the braided reinforcement member (16) as the member (16) is being pushed from the mandrel (42);

extruding an elastomeric cover (22) from a second extruder (26) onto the outer surface (18) of the braided reinforcement (16), said extruding of the elastomeric liner (21) and cover (22) occurring at approximately the same axial location and adjacent the mandrel (42);

pulling the reinforced hose (10) after it exits the second extruder (50) at a linear rate faster than the rate of extruding the hose (10) so that the braid angle of the reinforcement member (16) is changed to a predetermined braid angle; and holding the hose (10) to maintain the braid angle of the hose (10) at the predetermined braid angle for subsequent curing.

2. The method as set forth in claim 1, wherein the step of extruding the elastomer cover (22) includes preshaping the cover (22) and directing the preshaped cover in the axial direction of extruding for final forming.

3. A method of forming a flexible reinforced hose (10), comprising the steps of:

braiding a tubular reinforcement member (16) only directly on a tapered mandrel (42), said member (16) having inner and outer surfaces (17,18);

progressively pushing the member (16) from the tapered mandrel (42) by the braiding action;

extruding an elastomeric liner (21) from a first extruder (24) onto the inner surface (17) of the braided reinforcement member (16) as the member (16) slides off the tapered mandrel (42); and extruding an elastomeric cover (22) from a second extruder (26) onto the outer surface (18) of the braided reinforcement member (16), said extruding of the elastomeric liner (21) and cover (22) occurring at approximately the same axial location and adjacent the tapered mandrel (42).

4. An apparatus (12) for forming a flexible reinforced hose (10), comprising:

a mandrel (42) having a first end portion (62);

a braiding machine (14) adapted to progressively braid a tubular reinforcement member (16) only directly on the mandrel (42), the reinforcement member (16) having inner and outer surfaces (17,18);

first means (19) for extruding a liner (22) onto the inner surface (17) of the reinforcement member (16) as the member (16) is being pushed from the mandrel (42) by the braiding action;

second means (20) for extruding a cover (22) onto the outer surface (18) of the reinforcement member (116), said liner (21) and cover (22) being extruded at approximately the same axial location and adjacent the first end portion (62) of the mandrel (42); and means (23) for pulling the hose (10) after it exits the second extruder means (26) at a linear rate faster than the rate of extruding the hose (10) so that a predetermined braid angle is established in the reinforcement member (16) and for holding the hose (10) to maintain the predetermined braid angle for subsequent curing.

5. The apparatus (12), as set forth in claim 6, wherein the apparatus includes a drive mechanism (47) adapted to drive the pulling means (23) proportional to the linear rate of the hose (10) exiting the second extruder means (26).

6. The apparatus (12) as set forth in claim 4, wherein the first and second extruding means (19,20) include a first extruder (24), a second extruder (26), and a die mechanism (32) adapted to respectively form the liner (21) and cover (22), said mandrel (42) is mounted on the first extruder (24), said die mechanism (32) includes an internal shaping member (66) mounted on the first extruder (24) and extending through the mandrel (42), an external shaping member (76) mounted on the second extruder (26), and an adjustment mechanism (39) adapted to adjust the external shaping member (76) in all directions relative to the mandrel (42) and the internal shaping member (66).

7. An apparatus (12) for forming a flexible reinforced hose (10), said apparatus including a braiding machine (14) adapted to braid a tubular reinforcement member (16) of the flexible hose (10), said tubular member (16) having inner and outer surfaces (17,18), a first extruder (24) adapted to form a liner (21) on the inner surface (17) of the tubular member (16), and a second extruder (26) adapted to form a cover (22) on the outer surface (18) of the tubular member (16), comprising:

a tapered mandrel (42) having first and second end portions (62,64), said second end portion (64) of the tapered mandrel (42) being mounted on said first extruder (24), said braiding machine (14) adapted to braid the tubular reinforcement member (16) only directly onto the tapered mandrel (42) and progressively push the tubular reinforcement member (16) from the tapered mandrel (42) responsive to the braiding action, and said liner (22) and cover (24) being extruded onto the tubular reinforcement member (16) adjacent the first end portion (62) of the tapered mandrel (42) and at approximately the same axial location.

8. The apparatus (12), as set forth in claim 7, including an internal shaping member (66) mounted on the first extruder (24) and extending through the mandrel (42), an external shaping member (76) mounted on the second extruder (26), and an adjustment mechanism (39) adapted to adjust the external shaping member (76) in all directions relative to the mandrel (42) and the internal shaping member (66).

* * * * *

UNITED STATES PATENT AND TRADEMARK OFFICE
CERTIFICATE OF CORRECTION

PATENT NO. : 4,501,629

DATED : February 26, 1985

INVENTOR(S) : Ronald L. Satzler

It is certified that error appears in the above-identified patent and that said Letters Patent is hereby corrected as shown below:

Column 8, line 8: delete "6" and insert --4--.

Signed and Sealed this

Twentieth Day of August 1985

[SEAL]

Attest:

DONALD J. QUIGG

Attesting Officer

Acting Commissioner of Patents and Trademarks

Disclaimer 4,501,629—*Ronald L. Satzler* Princeville, Ill., METHOD AND APPARATUS FOR EXTRUDING REINFORCED HOSE. Patent dated Feb. 26, 1985. Disclaimer filed Aug. 22, 1991, by the assignee, Caterpillar Inc.

Hereby enters this disclaimer to claim 3 of said patent.
[ *Official Gazette October 8, 1991* ]